United States Patent Office 3,422,909
Patented Jan. 21, 1969

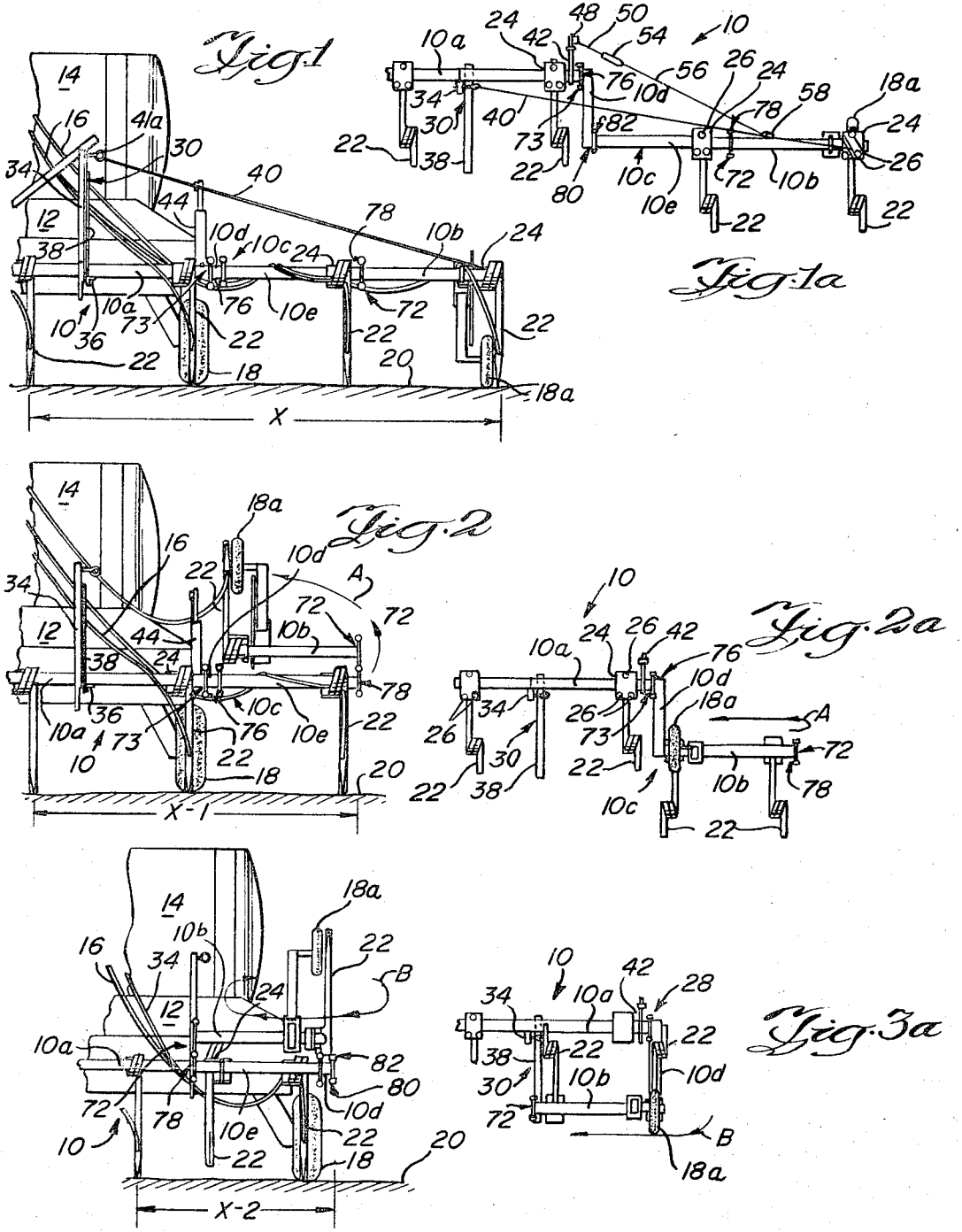

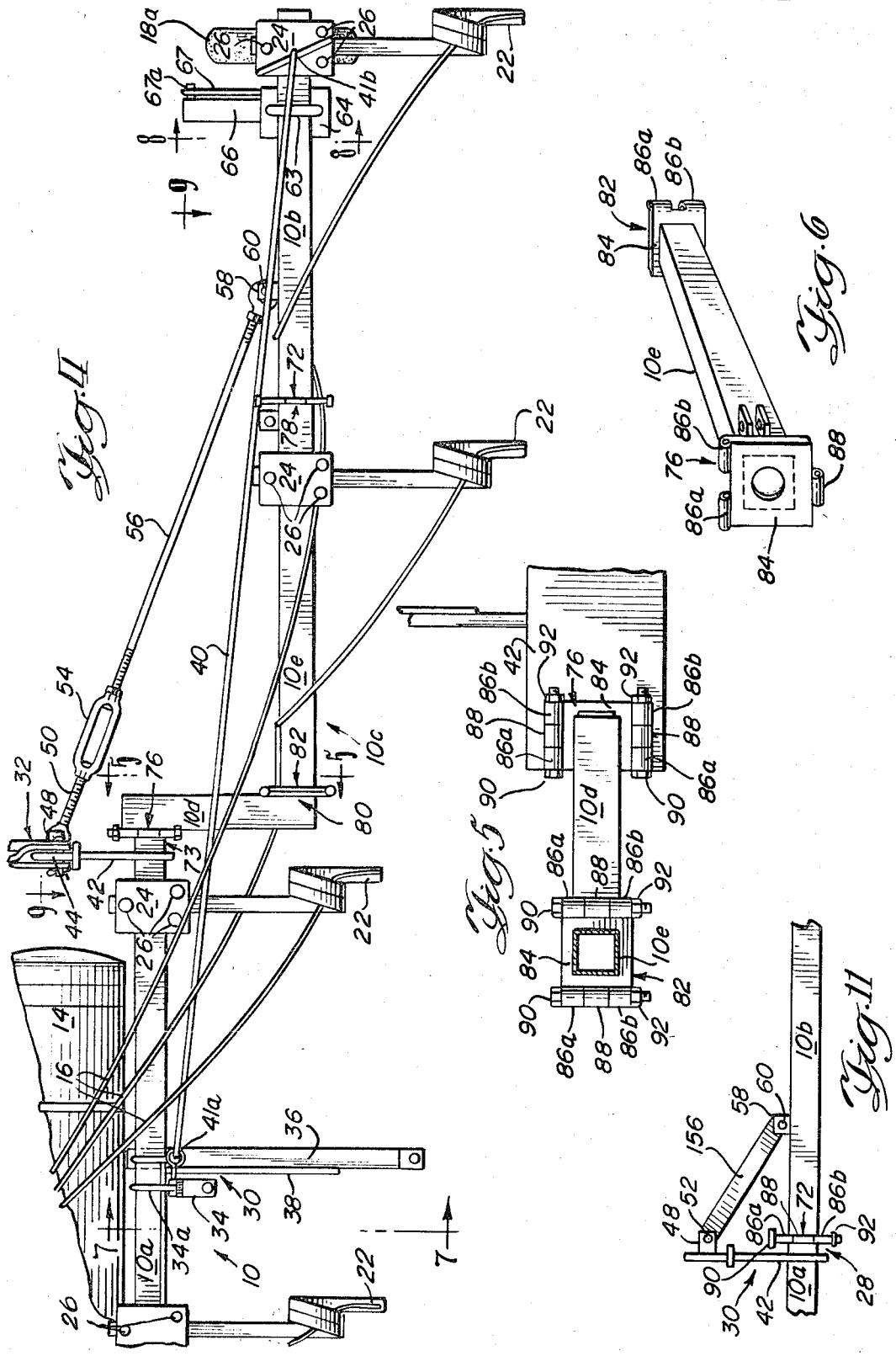

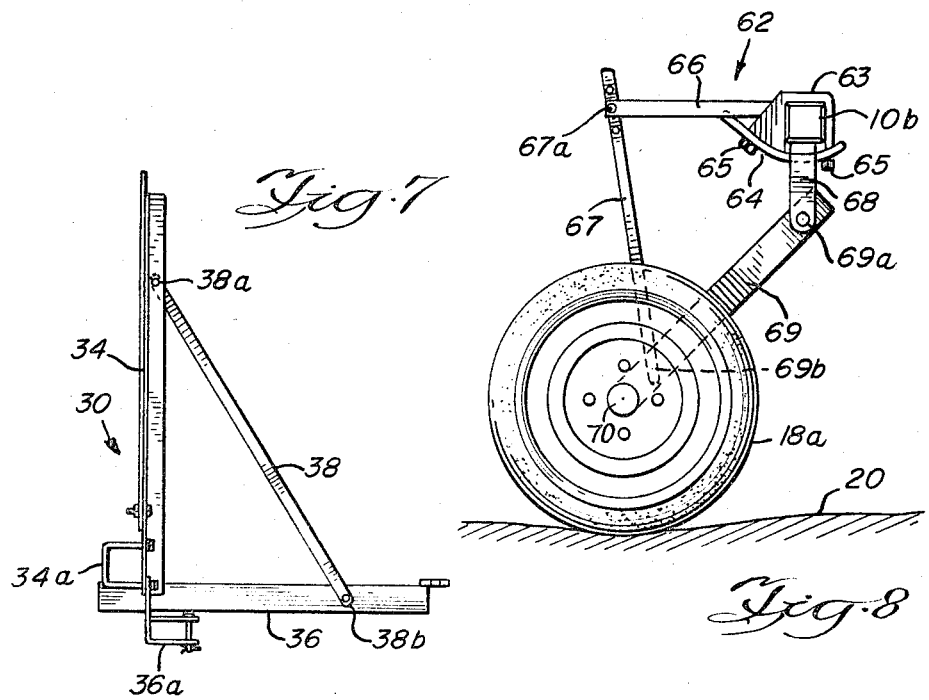
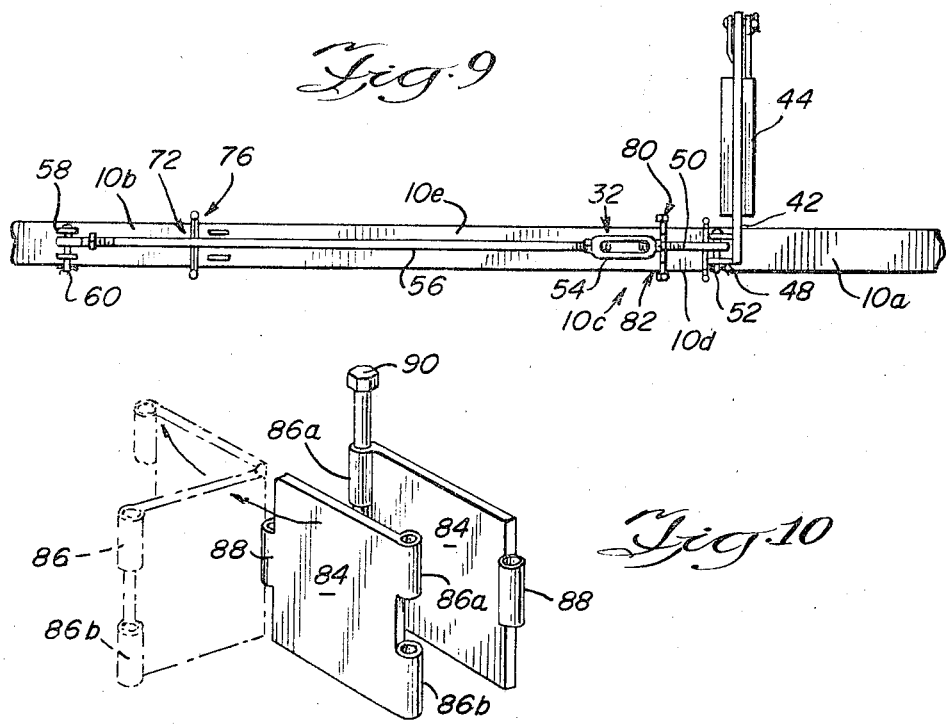

3,422,909
TOOL HOLDER ATTACHMENT FOR FARM
IMPLEMENT
Carl M. Jacobs, Decatur, Ill., assignor to Tryco Manufacturing Co., Inc., a corporation of Illinois
Filed Oct. 21, 1965, Ser. No. 499,873
U.S. Cl. 172—629         7 Claims
Int. Cl. A01b 19/04, 35/12, 63/102

ABSTRACT OF THE DISCLOSURE

A tool bar attachment for farm implements used in soil conditioning, such as fertilizing, the attachment being of the type that is normally mounted generally transversely to the path of travel of a prime mover, characterized in that the attachment has a plurality of hingedly connected sections arranged for swinging movement in different planes for rapid and facile conversion from field use to compactness for highway travel.

---

This invention relates to farm implements and more particularly to a new and novel tool attachment for use with farm implements such as a fertilizer applicator or the like.

Many farm implements, in general, take the form of an attachment to a self-propelled vehicle, such as a tractor, or an attachment to a towed vehicle, such as a trailer or the like. This type of implement is usually used in field work and preferably spans several rows of the field so that more work can be accomplished by the implement with less trips back and forth across the field. Harrows, discs and plows are only a few of the types of implements in this general category. The general concept of this invention is applicable to all such attachments, and the particular embodiment shown relates to an attachment for use with fertilizer applicators.

With this class of attachments in general, conditions may be encountered where a relatively wide swath or path of the field may be worked upon at one time whereas, due to different terrain, different soil conditions or reduced power of the vehicle which is the prime mover, only a smaller path or number of rows may be worked upon at some other time. If the attachment is designed to meet only minimum conditions, then when the maximum conditions prevail, the equipment is still limited to its minimum capability and the advantage cannot be taken of the maximum conditions. Conversely, if the equipment is designed to meet maximum conditions, then it will not be capable of use when minimum conditions prevail or may perform poorly under such minimum conditions.

In addition, this type of attachment, when built of such a span as to perform under maximum conditions and work on the widest swath possible in one given pass through the field may not be capable of being towed from one location to another because its span may violate highway codes, may exceed the width of certain obstructions such as bridges, tunnels, or exceed the width of avenues of ingress or egress from the fields such as gates and the like.

Thus it is desirable and it is the purpose of this invention to provide a farm implement attachment arrangement which is capable of being easily converted from a first span capable of use in minimum conditions to a second widened span capable of use in maximum conditions and wherein the attachment, when in the form of the widened span, may be easily collapsed to a reduced span to permit transportability of the attachment by normal towing between different locations without violating appropriate highway codes, as well as capable of traversing obstructions in the normal path of travel of the vehicle and without placing undue strain on the equipment itself.

It is therefore a primary object of this invention to provide a new and improved farm implement attachment.

It is another object of this invention to provide a new and improved farm implement attachment which is capable of being easily and readily converted from a minimum span to a maximum span to change the width of the working swath of the implement through the field.

Still another object of this invention is to provide a new and improved farm implement attachment which may be easily collapsed to a retracted position when the attachment is assembled for working a maximum swath to afford transportability to the attachment from one location to another.

Yet another object of this invention is to provide a novel insert member for a farm implement attachment which permits convertability of the attachment from a first relatively narrow working swath to a second widened working swath and which permits the attachment to be readily collapsed when in the widened working condition to a condition wherein the attachment may be transported from one location to another.

Other objects, features and advantages of the present invention will be apparent from the following description of the preferred embodiments ilustrated in the accompanying drawings, in which:

FIGURE 1 is a fragmentary rear elevational view of a portion of the attachment of this invention;

FIGURE 1a is a fragmentary top plan view of a portion of the structure shown in FIGURE 1;

FIGURE 2 is a fragmentary rear elevational view similar to FIGURE 1 showing the attachment in a first collapsed position;

FIGURE 2a is a fragmentary top plan view of a portion of the structure shown in FIGURE 2;

FIGURE 3 is a fragmentary rear elevational view with the attachment in the final collapsed condition;

FIGURE 3a is a fragmentary top plan view of a portion of the structure as shown in FIGURE 3;

FIGURE 4 is an enlarged fragmentary top plan view of a portion of the attachment of this invention;

FIGURE 5 is a fragmentary enlarged sectional view taken along the line 5—5 of FIGURE 4 showing a portion of the insert member of the attachment of this invention;

FIGURE 6 is a perspective view of another component of the insert member used with the attachment of this invention;

FIGURE 7 is a fragmentary enlarged sectional view taken along the line 7—7 of FIGURE 4 showing a vertical support component utilized with the attachment of this invention;

FIGURE 8 is a sectional view taken along the line 8—8 of FIGURE 4 showing the outrigger wheel support used on the attachment of this invention;

FIGURE 9 is a fragmentary sectional view taken along the line 9—9 of FIGURE 4 showing the insert assembly used with the attachment of this invention;

FIGURE 10 is a perspective view of the several hinge connections of the several components of the attachment of this invention; and FIGURE 11 is a fragmentary view of a portion of the attachment of this invention with the insert member removed.

The implement attachment or tool bar assembly 10 of this invention is comprised of a plurality of portions including a middle portion or member 10a, an outrigger portion or member 10b and an insert assembly generally indicated 10c which includes an offset bar 10d and an extension bar 10e. Each of the several portions 10a, b, d, and e is formed of generally hollow square metal bar stock. This type of attachment may be mounted on a towed vehicle, such as a trailer 12, which carries a reservoir or tank 14 containing a suitable liquid fertilizer. Fluid lines 16 lead from the reservoir to spaced points along the attachment 10 for feeding the liquid fertilizer as the trailer is towed. Trailer wheels 18 serve to hold the trailer in an elevated condition relative to the supporting surface 20 and when the attachment is in the extended position as shown in FIGURES 1 and 4, wheels 18a on the extreme end of the outrigger portion also assist in holding the attachment elevated relative to the ground 20. The attachment is provided with a plurality of knives 22 which dig into the ground as the trailer is pulled therealong to provide a small furrow into which the liquid fertilizer may be directed through the lines 16 which are connected to the knives. The knives are connected to the assembly by clamp plates 24 which overlie the tool bar and fastening means 26 such as a nut and bolt arrangement which extend through the plates 24.

The assembly is further provided with a vertical outrigger support component 30 and a horizontal outrigger support component 32. Vertical support component 30 includes a bar 34 which extends upright relative to the middle bar 10a and is attached thereto by a U-bolt arrangement 34a. In addition, a horizontal bar 36 extends rearwardly from the middle bar 10a and is also attached thereto by a U-bolt arrangement 36a. The upright bar 34 and trailing bar 36 are positioned adjacent one another and a bracing or hypotenuse bar 38 extends between a connection 38a with the upright bar and the connection 38b with the trailing bar to lend rigidity to the structure. A supporting cable 40 extends between a connection 41a with the upper end of the upright bar 34 and a connection 41b with the extreme end of the outrigger portion 10b of the attachment to assist the outrigger wheel 18 in maintaining the attachment in the same horizontal plane.

The horizontal support component 32 includes a bar 42 welded to the outer end of the middle member 10a and extending forwardly therefrom in addition to an upright member 44 which extends upwardly from the forward end of bar 42. Upright member 44 provides a means for attaching the assembly to the trailer. Bar 42 is provided with a clevis 48 for receiving the eye end of a threaded eye bolt 50 which is fastened thereto by means 52 such as a cotter key and pin arrangement as illustrated. Eye bolt 50 is threaded on a turnbuckle 54 which in turn receives a threaded eye bolt 56 that extends to the clevis 58 on outrigger bar 10b. The bolt 56 is also fastened to bar 10b by fastening means 60 which may take the form of a cotter key and pin arrangement as illustrated.

As illustrated in detail in FIGURE 8, the outer end of the outrigger is provided with a wheel support means 62 which includes a U-bolt 63 wrapped about outrigger portion 10b and extending through a clamp member 64 on the underside of the outrigger portion and secured thereto by nuts 65. Clamp 64 is a part of the forwardly extending arm 66 which supports a downwardly extending brace 67 connected to arm 66 at 67a. In addition, the clamp 64 carries a downwardly extending arm 68 which supports a forwardly and downwardly extending brace 69 secured to arm 68 at 69a and secured to brace 67 at 69b. The lowermost end of arm 69 is provided with axle stub 70 to which a wheel 18a is connected for rotation as the trailer is moved over the supporting surface 20.

At its inner end, outrigger member 10b is provided with a hinge component 72 which has a mating configuration relative to hinge component 73 formed on each of the free ends of middle member 10a. Insert assembly 10c is provided with a hinge component 76 at its inner end which mates with the hinge component on middle bar 10a and is provided with a hinge component 78 at its outer end which mates with the hinge component 72 of the outrigger. In addition, the outrigger is provided with an intermediate hinge arrangement including the hinge components 80–82 formed at adjacent ends of the offset bar 10d and insert bar 10e, respectively.

The hinge components 80–82 on the bars 10d–10e, respectively, are constructed and arranged to afford a hinging action in a plane which is traverse to the plane of hinging action afforded by the hinge connections 73–76 and 72–78. In the preferred embodiment, this hinging is, in the case of connection 73–76 and connection 72–78, for swinging movement in a vertical plane while in the case of the connection 80–82, is for swinging movement in a horizontal plane.

Each of the several hinge connections illustrated is made up of components which comprise a generally flat, wide plate 84 formed at the end of the appropriate bar member. One side of each plate 84 is provided with two hollow spaced cylindrical hinge sleeves 86a–86b and the other side is provided with an intermediate hollow hinge sleeve 88 of a size and shape to matingly engage in the space between the sleeves 86a and 86b. When juxtaposed with similar sides inverted relative to each other, the sleeves 86a–86b of one hinge component receive the side having sleeve 88 of the other hinge component and viceversa. The connection is locked as a stable connection by extending hinging and locking pins 90 through each side of the assembled hinge components and threading nut 92 at the lower end of each pin. By removing one nut 92 and its pin 90 from one side of the connection, a hinge is then created which permits a swinging action to be afforded between adjacent members of the assembly about an axis established by the remaining pin.

The operation of collapsing the assembly is best shown in FIGURES 1 through 3a wherein only slightly more than one-half of the structure is shown, it being understood that that portion of the structure on the other side of the center line is substantially a mirror image of the portion illustrated. In FIGURES 1 and 1a, the attachment of this invention is shown as assembled in a condition to support seven fertilizing knives (only the knife mounted on the vertical center line and the three knives to one side thereof being shown for purposes of illustration). Such a span enables seven rows of a field to be worked upon at the same time but is generally regarded as too wide for transporting the trailer and attachment along public roads between fields of use.

The first stage of collapsing the structure is shown in FIGURES 2 and 2a. The cable 40 and eye bolts 50 and 56 are disconnected from the tool bar. Then the lower pin 90 is removed from the hinge connection 72–78 to create a hinge which affords an upward swinging movement between the outrigger member 10b and the bar 10e in a first or vertical plane as indicated by the arrow A in FIGURES 2 and 2a. This reduces the span of the attachment by the length of the member 10b as is indicated by the dimension X–1 in FIGURE 2. This also positions the outrigger wheel support 62 so that it extends upwardly and above the attachment, free and clear from the supporting surface 20.

Next the innermost pin 90 is removed from the connection 80–82 to create a hinge which is swingable outwardly in a second or horizontal plane. The bar 10e with its superposed bar 10b is swung about this connection first outwardly to the rear and then back upon the assembly in the direction indicated by the arrow B in FIGURES 3 and 3a. This again reduces the dimension of the assembly as indicated by the dimension X-2 in FIGURE 3 so that now the assembly is substantially no wider than the trailer upon which it is mounted and may be transported along public roads in conformance with regulations regarding the width of vehicles.

When it is desirable to change the attachment to a reduced width, such as that indicated by X-1 in FIGURE 2, to that, for example, it becomes a five-knife attachment, in order to perform satisfactorily under different field conditions, this transformation may be easily and simply made by the tool bar assembly of this invention. In FIGURE 11, which is a fragmentary view of the bar modified to a reduced width, the outrigger bar 10b is shown as laterally adjacent the middle bar 10a with the insert piece 10c including offset bar 10d and insert bar 10e removed. The hinge component 72 is the same as the component 76 on offset bar 10d and is therefore a mating element for hinge component 28. Thus bar 10b and bar 10a may be easily assembled by means of this connection without the need for any auxiliary members or modification in the structure. The only change necessary in the horizontal support means is the substitution of a short bar 156 for the structure 50–54–56. This bar extends between the clevis 48 and 58 and is secured by the same fastening arrangement 52 and 60 to lend rigidity to the outrigger member 10b.

The foregoing detailed description has been given for clearness of understanding only, and no unnecessary limitations should be understood therefrom, as some modifications may be obvious to those skilled in the art.

I claim:

1. A working tool attachment for a farm implement for working on a plurality of rows in a field during a single trip through the field, comprising: a first tool mounting member constructed and arranged for attachment to a farm implement, said first tool mounting member having connecting means formed at the opposite free ends thereof; a second insert member attached to each end of the tool mounting member, said second insert member having one connecting end mating with and connected to the first mounting member connecting means, said second insert member having an outer end with a connecting means substantially similar to said first mounting member connecting means, and said insert member being provided with a hinged portion intermediate its ends, said hinged portion constructed for swinging movement about a generally upright axis during use thereof; and an outrigger member attached to the outer end of each of said insert members and having a connecting end which mates with said insert member outer end connecting means and which is substantially identical with said insert member one connecting end so that the effective span of said attachment may be reduced by swinging said insert member about an upright axis or by removing said insert member and attaching said outrigger member directly to said first tool mounting member by connecting the outrigger connecting end with the tool mounting member connecting means.

2. The tool attachment of claim 1 wherein said second insert member has an offset portion intermediate its ends to position the outrigger member in a different vertical plane with respect to the first member.

3. For use with a tool bar attachment for a farm implement, including inner and outer members having connecting ends connected to each other, an insert member, comprising: a bar of relatively rigid material for insertion between the inner and outer members of the attachment, the inner end of the bar having a hinged connecting portion constructed and arranged to mate with the inner member connecting end and for swinging movement in a first plane, the outer end of the bar having a hinged connecting portion constructed and arranged to mate with the outer member connecting end and for swinging movement in said first plane, and a hinge intermediate the ends of the insert bar constructed and arranged for movement in a plane transverse to said first plane so that said bar may be inserted between the inner and outer members of a tool bar attachment to increase the working span of the attachment and to permit the increased span to be collapsed upon itself about the insert member hinge for portability of the attachment between areas of use.

4. The insert member of claim 3 wherein said member has an offset portion intermediate its ends to position the outer member in a different vertical plane with respect to the inner member.

5. The insert member of claim 3 wherein said insert member intermediate hinge includes spaced mating slot elements normally connected by a plurality of pins to form a rigid member and being transformable into a swingable hinge by removal of all but one of the pins.

6. A working tool attachment for a farm implement for working a plurality of rows in a field during a single trip through the field, comprising: a first tool mounting member constructed and arranged for attachment to a farm implement, said first tool mounting member having hinge means formed at the opposite ends thereof for connection with another member for swinging movement in a first plane; a second insert member attached to each end of the tool mounting member, said second insert member having one inner connecting end mating with and connected to the first mounting member connecting end, said second insert member also having an outer connecting end substantially identical with said first mounting member connecting end, and said insert member being provided with a hinged portion intermediate its ends, said hinged portion being constructed and arranged for swinging movement in a plane generally perpendicular to said first plane; and an outrigger member having an inner connecting end for attaching the outrigger member to the outer end of the insert member, said outrigger inner connecting end mating with said insert member outer end and substantially identical with said insert member inner end, said first member outer end and said second member outer end being substantially mirror images of said second member inner end and said outrigger member inner end so that the effective span of the attachment may be reduced by removing said insert member and attaching said outrigger member directly to said first tool mounting member, each of the connecting ends including mating spaced apart slot elements on each member constructed and arranged to mate with the slot element of the adjacent member for reception of a pin so that when pins are placed through the mating spaced slot elements of adjacent elements a rigid connection is formed and by removing all but one pin of the mating slot elements, a swingable hinged connection is afforded between adjacent hinged members to permit the members to be collapsed upon themselves and reduce the effective span of the attachment to thereby provide for portability of the farm implement between areas of use.

7. An applicator unit mounted for movement on spaced supporting wheels, the width of the path of movement of the unit normally generally defined by the distance between the wheels, comprising: a tool bar frame secured to the unit and having a plurality of tools mounted thereon, first and second outer tool bars extending outwardly from each of the opposite ends of the tool bar frame beyond the path of movement of the unit and each having at least one tool thereon; means mounting each of said outer tool bars to the tool bar frame for movement with the unit in either a lowered operative position or a raised collapsed position including a first hinge means connected between the first and second tool bars defining a horizontal pivot located above the plane of said tool bars whereby the second outer tool bar can be folded up in a vertical plane and to a collapsed position overlying and closely adjacent the first outer tool bar, and a second hinge means between the first outer tool bar and the tool bar frame defining a vertical pivot to the rear of the first outer tool bar whereby the superimposed outer tool bars can be moved in a horizontal plane to a position rearwardly of said tool bar frame and within the path of movement.

References Cited

UNITED STATES PATENTS

| | | | |
|---|---|---|---|
| 61,421 | 1/1867 | Hancock | 16—170 |
| 83,760 | 11/1868 | Carkeet | 16—163 |
| 3,122,210 | 2/1964 | French | 172—456 |
| 3,218,999 | 11/1965 | Pattison | 172—456 |
| 3,321,028 | 5/1967 | Groenke | 172—456 |

ABRAHAM G. STONE, *Primary Examiner.*

STEPHEN C. PELLEGRINO, *Assistant Examiner.*

U.S. Cl. X.R.

172—456